3,198,778
PROCESS FOR PREPARING AND VULCANIZING OLEFIN COPOLYMERS CONTAINING UNSATURATION
Giulio Natta, Giovanni Crespi, and Mario Bruzzone, all of Milan, Italy, assignors to Montecatini, Societa Generale per l'Industria Mineraria e Chimica, Milan, Italy, a corporation of Italy
No Drawing. Filed Sept. 26, 1960, Ser. No. 58,183
Claims priority, application Italy, Sept. 30, 1959, 16,282/59
12 Claims. (Cl. 260—88.2)

The vulcanization of copolymers of ethylene with an alpha-olefin, more particularly of ethylene-propylene and ethylene-butene copolymers, cannot be carried out using the usual ingredients used in the field of unsaturated rubbers, due to the absence of unsaturation and to the lower reactivity of the tertiary hydrogen of the alpha-olefin in respect of the allyl hydrogen.

It is because of these reasons that satisfactory results have not been obtained either by using sulfur along with normal accelerators or with sulfur along with ultra-accelerators which cause the formation of disubstitutive cross-links in the vulcanization of unsaturated rubber by substitution of two allyl hydrogens, without any addition to the double bond, according to:

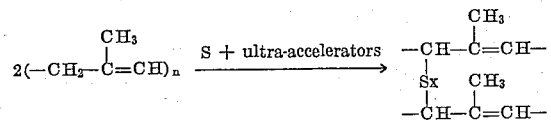

Attempts have been made to render such polymers vulcanizable by dehydrogenation with sulfur at high temperatures (180–300° C.). The polymeric products dehydrogenated in this way can be then vulcanized with the usual vulcanizing agents and accelerators employed for unsaturated rubbers.

Another method which permits the vulcanization of ethylene-propylene copolymers using the conventional ingredients used for unsaturated rubbers consists of chlorinating such copolymers (as described in Italian Patent No. 571,587 in the name of Du Pont). According to this patent, an ethylene-propylene copolymer can be vulcanized with the ingredients traditionally employed in the field of unsaturated rubbers provided the copolymer is previously chlorinated up to a chlorine content from about 10 to 35% by weight (and preferably from 15 to 25% by weight). However, the dynamic characteristics of these elastomers are not satisfactory due to the high chlorine content, which content reduces the flexibility of the macromolecular chains. For instance, the temperature of minimum rebound elasticity for a copolymer containing 50 mole percent ethylene and chlorinated up to a chlorine content of 20% by weight is about 0° C. On the other hand when the process of said Italian patent is employed, a chlorine content higher than 10% is needed in order to reach a sufficient degree of vulcanization. In fact even the product of Example 3 of the aforementioned Italian patent, which product contains only 12.9% chlorine, shows a compression set undesirably high (45%).

Moreover, copolymers containing high chlorine content (i.e., higher than 10%) require stabilization with suitable substance (e.g., low molecular weight epoxy resins). In spite of such stabilization however, and particularly when the temperature of use of such elastomers is high, the vulcanized product can easily release hydrochloric acid, which may then in turn deteriorate the substances with which the elastomer is in contact (e.g., fabrics, cords or wires incorporated in the elastomers). Further, the liberation of hydrochloric acid can result in the vulcanized product being more easily attacked by aging agents (e.g. oxygen, ozone, atmospheric agents) and can cause discoloration of the vulcanized products to a light color.

The primary object of the present invention is to create, in the olefinic copolymer chains containing ethylene, some unsaturation, but to avoid insofar as possible the introduction of other reactive groups such as halogen groups, which groups favor vulcanization but worsen the dynamic properties (rebound elasticity, shrinking rates, etc.) and also decrease resistance to aging.

Additional objects will become apparent hereinafter.

According to the invention, this aim is attained by carrying out a chlorination of the olefin copolymer, e.g., ethylene-propylene or ethylene-butene copolymers, with extremely low amounts of chlorine (i.e., of an order tenfold lower than that used heretofore as in said Italian Patent No. 571,587) followed by a dehydrochlorination carried out under controlled conditions so as to obtain an unsaturated copolymer which contains at most a negligible amount of combined chlorine.

Such copolymers as to which the present invention is particularly useful are prepared from polymers containing from about 30 to 80 mole percent ethylene, the remaining portion being made up of alpha-olefin, and wherein the molecular weight of the copolymer is greater than 100,000.

The present invention makes it possible to carry out the chlorination in such manner as to obtain a homogeneously chlorinated product (which is indispensable for the subsequent operations) by operating with highly concentrated copolymer solutions or with the copolymer in the solid state. This also permits the carrying out of the dehydrochlorination to obtain high yields without seriously degrading the copolymer.

The formation of double bonds by dehydrochlorination of chlorinated polymers is known in the art as regards halogen-containing vinyl polymers such as polyvinyl chloride. And, with respect to the aforementioned Italian patent, some dehydrochlorination takes place during the vulcanization stage of the chlorinated copolymer. But the copolymer, containing a high chlorine amount, tends to lose hydrochloric acid at relatively low temperature.

We have found that copolymers of ethylene with alpha-olefins, which copolymers contain an extremely low chlorine amount (1 to 3% by weight) homogeneously distributed along the chain, can be dehydrochlorinated completely (by removing 60 to 100% of the initially combined chlorine), provided that the dehydrochlorination is carried out at exceptionally high temperatures (e.g., 180–250° C.) for a sufficiently long time, e.g., from 5 to 100 hours (unless the dehydrochlorination is carried out in the presence of suitable catalysts whereby the time may be reduced). Notwithstanding the fact that the copolymers contain a considerable proportion of tertiary carbon atoms and that most of chlorine is therefore bound to these carbon atoms, we have found that dehydrochlorination is extremely difficult, especially when the fixed chlorine amounts are very low and the chlorine is homogeneously distributed. Copolymers containing a small percent of chlorine are extraordinarily stable and it is necessary to operate at very high temperatures in order to obtain a sufficient degree of dehydrochlorination within a sufficient limited time. Such high dehydrochlorination temperatures are tolerated only by polymers having a very low and homogeneously distributed chlorine content since, otherwise, strong dehydrochlorination reactions occur, localized in the points of high chlorine content, and resulting in an undesired degradation and/or cross-linking of the copolymer. After the dehydrochlorination at high temperatures, the copolymer is readily vulcanized with conventional ingredients used for unsaturated rubbers. The vulcanized product exhibits singularly stable characteristics, even at high working temperatures, and does not show any further hydrochloric acid loss because in the preceding stage it has already been subjected to a very severe dehydrochlorination process.

As stated previously, a homogeneously chlorinated copolymer is required. This could be attained, even heretofore when highly concentrated copolymer solutions were used, by employing a chlorine solution for the chlorination, e.g., chlorine dissolved in a suitable solvent such as $CHCl_3$ or $CCl_4$ (instead of bubbling chlorine gas through a copolymer solution), and carrying out the complete mixing of the chlorine solution with the swollen copolymer at a low temperature so that, due to the induction period (the lower the temperature, the higher the induction period), the solution could not react until homogeneity was reached. At this point the mixture would be heated until the reaction was completed.

Homogeneous chlorination of the copolymer in the absence of a solvent and swelling agents is less easy, since the chlorination tends to localize at the surface.

We have found that by operating at very low temperatures, temperatures only a little higher than the transition temperature of the present macromolecules rich in propylene or butene, it is possible in several hours to absorb chlorine from a mixture of chlorine and an inert gas. Chlorination takes place upon subsequently heating the copolymer, preferably in the absence of the gaseous phase.

We have also found that the homogeneous chlorination of the copolymer can be carried out in the absence of solvents or swelling agents by mixing the copolymer (before contacting it with gaseous chlorine) with small amounts (e.g., 0.5 to 3%) of substances (e.g., quinone compounds) which act as retardants or, preferably, prolong the induction period of the radicalic reactions. Chlorine can therefore diffuse in the polymer granules without reacting, and at temperatures as high as 25–30° C. After chlorine is homogeneously dissolved in the polymer, chlorination takes place by heating the polymer, preferably in the absence of a gaseous phase.

The chlorinated copolymer can be dehydrochlorinated by heating, without any other addition, or by heating in the presence of hydrochloric acid acceptors such as metal oxides, particularly zinc oxide. Thus, the reaction product of zinc oxide with any hydrochloric acid developed by the copolymer has shown a catalytic activity for dehydrochlorination. The addition of such oxides or of other catalysts of a radical or ionic nature (peroxides, organic azo compounds or iron or aluminum chlorides, etc.) makes it possible to materially reduce the dehydrochlorination time.

The temperature of the dehydrochlorination exhibits a remarkable influence on the dehydrochlorination rate and has a particularly useful effect in that it results in a higher dehydrochlorination rate for the secondary chlorine groups which are less reactive than for the tertiary clorine groups. Accordingly, the secondary chlorine groups partake actively in the formation of unsaturation. In Table I hereinafter, there is reported the modulus at 300% elongation for vulcanized products obtained from a polymer containing 1.98% by weight of chlorine, mixed with 10 parts zinc oxide and 10 parts magnesium oxide and dehydrochlorinated at 200° C., for increasing periods of time. (The mix and the vulcanization conditions are indicated in the table.)

TABLE I

[Modulus at 300% elongation of vulcanized products obtained from an ethylene-propylene copolymer (50 mole percent ethylene) chlorinated up to a chlorine content of 1.98% and dehydrochlorinated for increasing times at 200° C. in the presence of 10 parts ZnO and 10 parts MgO per 100 parts polymer. Vulcanization mix: 100 parts dehydrochlorinated polymer, 2 parts sulfur, 2 parts tetramethylthiouram disulfide, 1 part mercaptobenzothiazole, 2 parts stearic acid, 1 part antioxidant 2246, 2,2 methylene bis(4 methyl 6 tert. butylphenol). Vulcanization at 160° C. for 30 minutes.]

| Dehydrochlorination time, hours: | Modulus at 300% kg./cm.$^2$ |
| --- | --- |
| 1 | 16.8 |
| 5 | 20 |
| 9 | 20.2 |
| 15 | 21.7 |
| 24 | 22 |
| 48 | 26.6 |
| 72 | 25.4 |
| 96 | 35 |

Virtually the same results are obtained with ethylene-butene copolymers (50 mole percent ethylene), chlorinated, dehydrochlorinated and vulcanized under conditions similar to those mentioned above.

The following examples will further illustrate our invention. All parts are by weight unless otherwise stated.

*Example 1*

400 g. ethylene-propylene copolymer containing 50 mole percent ethylene along with 800 cc. carbon tetrachloride are placed in an enameled vessel provided with a strong anchor-agitator. 250 cc. carbon tetrachloride in which 19.1 g. chlorine have previously been dissolved are added to the mixture and the whole is cooled to −10° C. After a homogenization period at low temperature (from −10° to 0° C.), the mass is heated to 60° C. and maintained at this temperature until the development of hydrochloric acid has completely ceased. The solvent is then recovered by distillation. The chlorinated polymer, after the usual purification operations, has a Cl content of 2.23% by weight (yield 93% with respect to the amount of chlorine used). 100 parts of the polymer chlorinated as described above are mixed in a rubber mixer with 10 parts ZnO and 10 parts MgO and then heated to 200° C. under nitrogen for 15 hours. The product obtained is mixed with 2 parts sulfur, 3 parts stearic acid, 0.5 part tetramethylthiuram disulfide, 15 parts Circosol (Sun Oil Co.) NS, 50 parts carbon black HAF, and 1 part phenyl-beta-naphthylamine, and is vulcanized in a press at 150° C. for 30 minutes. The vulcanized product presents the following characteristics:

| | |
| --- | --- |
| Tensile strength _____kg./cm.$^2$____ | 155 |
| Elongation at break _____percent____ | 355 |
| Modulus at 100% elongation _____kg./cm.$^2$____ | 29 |
| Modulus at 300% elongation _____ kg./cm.$^2$____ | 125 |

*Example 2*

400 g. ethylene-propylene copolymer containing about 50 mole percent ethylene along with 400 cc. carbon tetrachloride are placed in an enameled vessel provided with a strong anchor-agitator. 260 cc. carbon tetrachloride in which 24 g. chlorine had previously been dissolved are added to the mix and the whole is cooled to −10° C. After a homogenization period at low temperature (from −10° C. to 0° C.) the mass is heated to 60° C. and is kept at this temperature until all development of hydrochloric acid has ceased. The solvent is then recovered by distillation. The chlorinated polymer, after purification by the usual methods, has a chlorine content of 2.52% by weight (yield of 84% based on the total chlorine used). 100 parts of the chlorinated polymer are mixed in a rubber mixer with 10 parts ZnO and 10 parts MgO and the mix is heated to 200° C. under nitrogen for 15 hours. The product obtained is mixed with 2 parts sulfur, 3 parts stearic acid, 2 parts tetramethylthiuram disulfide, 1 part mercaptobenzothiazole, 15 parts Circosol NS, 50 parts carbon black HAF, and 1 part phenyl-β-naphthylamine, and the mix is vulcanized in a press at 150° C. for 20 minutes. The vulcanized product presents the following characteristics:

| | |
|---|---|
| Tensile strength _____kg./cm.$^2$____ | 156 |
| Elongation at break _____percent____ | 335 |
| Modulus at 100% elongation _____kg./cm.$^2$____ | 34.5 |
| Modulus at 300% elongation _____kg./cm.$^2$____ | 138 |

*Example 3*

400 g. ethylene-propylene copolymer containing about 50 mole percent ethylene along with 400 cc. methylene chloride are placed in an enameled vessel provided with a strong anchor-agitator. 260 cc. methylene chloride in which 18.2 g. chlorine previously had been dissolved are added to the mixture, and the whole is cooled to −10° C. After a homogenization period at low temperature (from −10° C. to 0° C.) the mass is heated to the boiling point of methylene chloride (40° C.) by refluxing through a reflux condenser cooled with water at 0° C. When the development of hydrochloric acid ceases, the solvent is recovered by distillation. The chlorinated polymer, after purification, has a chlorine content of 1.48% by weight. 100 parts of the chlorinated polymer are mixed in a rubber mixer with 10 parts ZnO and 10 parts MgO and the mixture is heated to 200° C. under nitrogen for 19 hours. The product obtained is mixed with 2 parts sulfur, 3 parts stearic acid, 1 part tetramethylthiuram disulfide, 0.5 part mercaptobenzothiazole, 15 parts Circosol NS (non-staining naphthene oil), 50 parts carbon black HAF, and 1 part phenyl-β-naphthylamine, and the mix is vulcanized in a press at 150° C. for 30 minutes. The vulcanized product has the following characteristics:

| | |
|---|---|
| Tensile strength _____kg./cm.$^2$____ | 120 |
| Elongation at break _____percent____ | 335 |
| Modulus at 100% elongation _____kg./cm.$^2$____ | 28 |
| Modulus at 300% elongation _____kg./cm.$^2$____ | 99 |

*Example 4*

25 g. ethylene-propylene copolymer containing about 50 mole percent ethylene are mixed with 0.25 g. hydroquinone in a rubber mixer. The mix is finely divided and is placed in a glass absorption tower through which 0.08 N/litres/minute of gaseous chlorine is passed at 23° C. After 1 hour the absorbed chlorine amounts to 2.1 g. The chlorine flow is stopped and air is passed through the absorption tower. This causes a regular decrease in the chlorine content of the polymer. The de-absorption stage is stopped when the chlorine content amounts to 1.3 g. The polymer is then heated to 100° C. for 1 hour and the absorbed chlorine reacts with the polymer. The chlorine content of the chlorinated polymer amounts to 3.91% by weight. 100 parts of the chlorinated polymer are mixed in a rubber mixer with 10 parts ZnO and 10 parts MgO and the mixture is heated to 200° C. under nitrogen for 17 hours. The product obtained is mixed with 2 parts sulfur, 2 parts stearic acid, 2 parts tetramethylthiuram disulfide, 1 part mercaptobenzothiazole and 1 part phenyl-β-naphthylamine and the mix is vulcanized in a press at 160° C. for 30 minutes. The vulcanized product presents the following characteristics:

| | |
|---|---|
| Tensile strength _____kg./cm.$^2$__ | 44 |
| Elongation at break _____percent__ | 270 |
| Modulus at 100% elongation _____kg./cm.$^2$__ | 13 |

*Example 5*

400 g. ethylene-propylene copolymer containing about 50 mole percent ethylene along with 400 cc. methylene chloride are placed in an enameled vessel provided with a strong anchor-agitator. 130 cc. of methylene chloride in which 9.1 g. chlorine previously had been dissolved are added to the mixture and the whole is cooled to −10° C. After a homogenization period at a low temperature (from −10° to 0° C.) the mass is heated to the boiling point of methylene chloride (40° C.) by refluxing the latter in a reflux condenser cooled with water at 0° C. When the development of hydrochloric acid has ceased, the solvent is recovered by distillation. The chlorinated polymer, after purification, has a chlorine content of 0.96% by weight. 100 g. of this chlorinated polymer are mixed in a rubber mixer with 10 parts ZnO and 10 parts MgO, and the mixture is then heated in a press at 250° C. for 3 hours. The product obtained is mixed with 2 parts sulfur, 2 parts stearic acid, 2 parts tetramethylthiuram disulfide, 1 part mercaptobenzothiazole, and 1 part phenyl-β-naphthylamine, and the mix is vulcanized in a press at 150° C. for 30 minutes. The vulcanized product has the following characteritsics:

| | |
|---|---|
| Tensile strength _____kg./cm.$^2$__ | 31 |
| Elongation at break _____percent__ | 875 |
| Modulus at 300% elongation _____kg./cm.$^2$__ | 11 |

*Example 6*

400 g. ethylene-butene copolymer containing about 50 mole percent ethylene, along with 400 cc. methylene chloride are placed in an enameled vessel provided with a strong anchor-agitator. 130 cc. methylene chloride in which 9.1 g. chlorine previously had been dissolved are added to the mixture and the whole is cooled to −10° C. After a homogenization period at a low temperature (from −10° to 0° C.) the mass is heated to the boiling point of methylene chloride (40° C.) by refluxing the latter with a reflux condenser cooled with water at 0° C. When the development of HCl ceases, the solvent is recovered by distillation. The chlorinated polymer, after purification, presents a chlorine content of 1.05% by weight. The chlorinated polymer is placed in a vessel which is then evacuated and heated to 200° C. for 15 hours. The product obtained is mixed with 2 parts sulfur, 2 parts stearic acid, 2 parts tetramethylthiuram disulfide, 1 part mercaptobenzothiazole, and 1 part phenyl-β-naphthylamine, and the mix is vulcanized in a press at 150° C. for 30 minutes. The vulcanized product presents good mechanical characteristics and satisfactory dynamic properties.

Variations can of course be made without departing from the spirit of our invention.

Having thus described our invention, what we desire to secure and claim by Letters Patent is:

1. A method for preparing high molecular weight unsaturated copolymers of ethylene with a higher alpha-olefin selected from the group consisting of propylene and butene-1, which are sulfur-vulcanizable by processes used conventionally for the vulcanization of unsaturated rubbers, from high molecular weight amorphous and saturated copolymers of ethylene with the selected higher alpha-olefin, which method comprises contacting the saturated copolymer with from about 2 to about 6 parts by weight of chlorine per 100 parts of the amorphous copolymer under conditions such that the chlorine is distributed homogeneously in the copolymer without chemical combination of the chlorine with the copolymer, heating the resulting mass to a temperature not higher than 100° C. until from 1% to 3% by weight of chlorine is homogeneously combined with the copolymer, and then dehydrochlorinating the chlorinated copolymer at a temperature above 160° C. and between 160° C. and about 250° C., until virtually all of the 1% to 3% by weight of chlorine combined with the copolymer in the chlorinating step is removed.

2. The method of claim 1, wherein the copolymer used for preparing the unsaturated polymer contains from about 30 to 80 mols percent of ethylene, wherein the remaining portion is made up of the selected higher alpha-olefin, and wherein the molecular weight of the copolymer is greater than 100,000.

3. The method of claim 1, wherein the dehydrochlorination is carried out at a temperature from about 180° to 240° C. for a time in excess of 2 hours.

4. The method of claim 3, wherein the dehydrochlorination is carried out in the presence of an acid-acceptor catalyst.

5. The method of claim 4, wherein the catalyst is a metal salt.

6. The method of claim 5, wherein the metal portion of the catalyst is selected from Al, Zn, and Fe.

7. The method of claim 4, wherein the catalyst is a metal oxide.

8. The method of claim 7, wherein the metal portion of the catalyst is selected from the group consisting of Al, Fe, and Zn.

9. The method of claim 4, wherein the catalyst is an organic peroxide.

10. The method of claim 1, wherein the chlorination is carried out by mixing, at a temperature of about −10° C., the copolymer swollen by a chlorinated hydrocarbon, with a solution of chlorine in a chlorinated hydrocarbon, until the paste mass is homogenized, and thereafter initiating chlorination by heating in a reactor.

11. The method of claim 1, wherein the chlorination is carried out in the absence of solvent, by contacting the copolymer in divided state with a chlorine-containing gas at a low temperature and for a time sufficient to homogeneously dissolve the chlorine in the copolymer without reaction thereof, and then heating the mass in the absence of a gaseous phase to thereby initiate and to complete chlorination.

12. The method of claim 11, wherein the copolymer, prior to being contacted with chlorine, is mixed with a small amount of hydroquinone, whereby the chlorine dissolves in the copolymer without reaction.

References Cited in the file of this patent

UNITED STATES PATENTS 2,261,757   11/41   Fawcett _____ 260—94.9
2,850,490   9/58    Canterino et al. _____ 260—94.9

OTHER REFERENCES

Natta et al., Stereospecific Catalysis and Stereoregular Addition Polymers, volume II, paper 59 (effective date 1957), 11 pages, pages 1 and 2 only needed.

JOSEPH L. SCHOFER, *Primary Examiner.*

LESLIE H. GASTON, *Examiner.*